(12) United States Patent
Kim et al.

(10) Patent No.: US 6,707,522 B2
(45) Date of Patent: Mar. 16, 2004

(54) LIQUID CRYSTAL DISPLAY DEVICE

(75) Inventors: Sung Woon Kim, Kyoungki-do (KR); Jin Mahn Kim, Kyoungki-do (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/228,984

(22) Filed: Aug. 27, 2002

(65) Prior Publication Data

US 2003/0043330 A1 Mar. 6, 2003

(30) Foreign Application Priority Data

Aug. 29, 2001 (KR) ......................................... 2001-52533

(51) Int. Cl.$^7$ ............................................. G02F 1/1343
(52) U.S. Cl. ........................................ 349/139; 349/141
(58) Field of Search .......................... 349/44, 139, 141, 349/143, 149

(56) References Cited

U.S. PATENT DOCUMENTS

| | | |
|---|---|---|
| 5,933,202 A | 8/1999 | Watanabe et al. .............. 349/33 |
| 6,078,368 A * | 6/2000 | Ichikawa et al. .............. 349/48 |
| 6,223,034 B1 | 4/2001 | Yamashita ................... 455/432 |
| 6,344,842 B1 | 2/2002 | Hebiguchi .................... 345/96 |
| 2003/0035080 A1 * | 2/2003 | Battersby .................... 349/151 |

\* cited by examiner

*Primary Examiner*—Dung Nguyen
(74) *Attorney, Agent, or Firm*—Ladas & Parry

(57) ABSTRACT

Disclosed is a LCD comprising a substrate; a signal applying unit having a gate line and a common line on the substrate; and a display unit forming a plurality of pixels with a data line, a counter electrode, a pixel electrode, a TFT and the gate line and the common line extended from the signal applying unit, wherein the pixel electrode comprises a body unit and a branch unit, the body unit being parallel to the gate line and the branch unit comprising a plurality of branches being parallel to the data line, and pixel electrode of the outmost pixel that is the most adjacent to the signal applying unit has some of branches formed on the signal applying unit.

2 Claims, 4 Drawing Sheets

LIQUID CRYSTAL DISPLAY DEVICE

BACKGROUND OF THE INVENTION

1. Field of the Invention

The present invention relates to a liquid crystal display device, and more particularly to a liquid crystal display device realizing a high screen quality by preventing light leakage due to ion adsorption in a signal applying unit.

2. Description of the Prior Art

A liquid crystal display (hereinafter, referred to as LCD) has advantages of light weight, thin thickness and low power consumption, thereby advantageously applied to terminals of information apparatus and video apparatus instead of CRT (Cathode Ray Tube). Especially, TFT-LCD having thin film transistor (hereinafter, referred to as TFT) can realize the high screen quality and can be the large display device, because it has improved response features and is suitable for high number of pixels.

The LCD can be classified into Storage On Gate mode as illustrated in FIG. 1A and Storage On Common mode as illustrated in FIG. 1B by the line design.

As shown in FIG. 1A, the storage on gate mode LCD comprises a gate line 12 and a common line 14 in a signal applying unit 11 out of a display unit 10 realizing image on a substrate 19, applying signals into the display unit 10.

In the storage on gate mode LCD, all the pixels in the display unit 10 have the same structures and they are adjacent to a plurality of pixels comprising a gate line 12, a data line 13, a common line 14, a counter electrode 15, a pixel electrode 16 and a TFT LCD in the same manner.

However, the outmost pixel that is the most adjacent to the signal applying unit 11 has the structure different from other pixels in the display unit 10. Or, a data line is not formed in the direction of the signal applying unit 11 in the outmost pixel.

When a scanning signal is applied to one of gate lines 12 and a display signal is applied to the data line, a TFT 17 disposed at the intersection of the gate line and the data line is turned on. Then, the display signal of data line 13 is transmitted to the pixel electrode 16 through the TFT 17 and the common signal is continuously applied to the counter electrode 15, thereby generating electric field between the electrodes 15,16.

Therefore, liquid crystal molecules (not shown) are arranged to be parallel to the electric field (positive dielectric anisotropy) or to be perpendicular thereto (negative dielectric anisotropy), thereby light leakage is generated and a predetermined image is realized.

Referring to FIG. 1B, the storage on common mode LCD is the same manner.

There are, however, several problems in the conventional LCD.

For gate line and common line, difference between DC (direct current) component signal of gate line and that of common line causes voltage difference. The data line is swung into positive and negative voltage to common voltage in each frame, thereby preventing maintenance of a predetermined DC voltage.

As describe above, the conventional pixel the most adjacent to the signal applying unit has no data line formed in the direction of the signal applying unit. Therefore, ion adsorption is generated due to voltage difference between gate line and common line, and pixels are influenced by the resulting electric field.

In a normally black mode, outmost pixels, which are switched by the electric field generated due to ion adsorption, has a problem of light leakage in a low gray, thereby lowering screen quality.

SUMMARY OF THE INVENTION

The present invention has made to solve the above-mentioned problems and the primary objective of the present invention is to provide a LCD preventing light leakage due to ion adsorption in a signal applying unit by extending pixel electrode of outmost pixel to the signal applying unit.

In order to accomplish the objective, the present invention comprises: a substrate; a signal applying unit having a gate line and a common line on the substrate; and a display unit having a plurality of pixels with a data line, a counter electrode, a pixel electrode, a TFT and the gate line and the common line extended from the signal applying unit, wherein the pixel electrode comprises a body unit and a branch unit, the body unit being parallel to the gate line and the branch unit comprising a plurality of branches being parallel to the data line, and pixel electrode of the pixel the most adjacent to the signal applying unit has some of branches formed on the signal applying unit.

DETAILED DESCRIPTION OF THE INVENTION

The objects and features of the invention may be understood with reference to the following detailed description of an illustrative embodiment of the invention, taken together with the accompanying drawings.

Figure 1A:
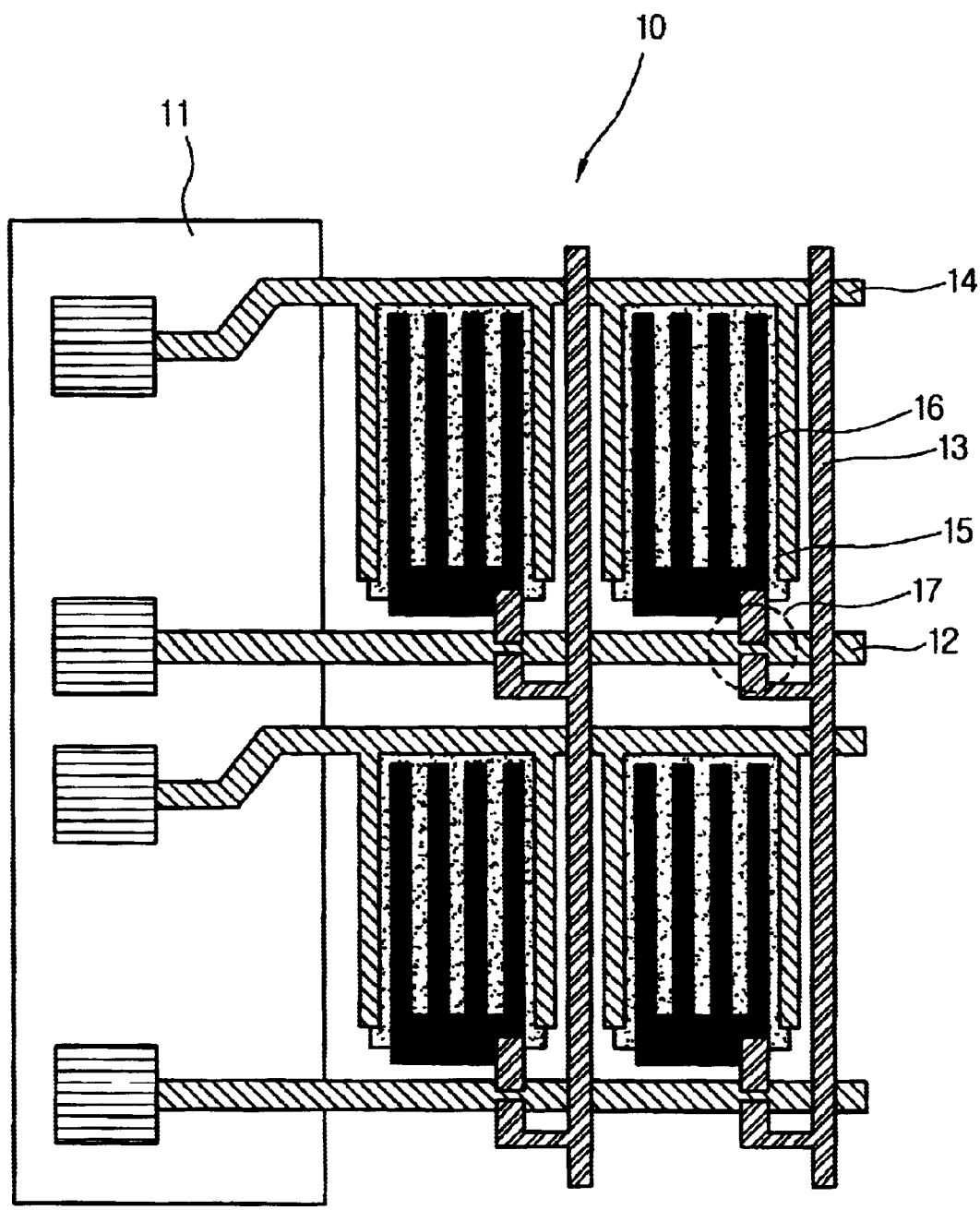
FIGS. 1A and 1B are cross-sectional views of LCD according to a conventional method.
Figure 1B:
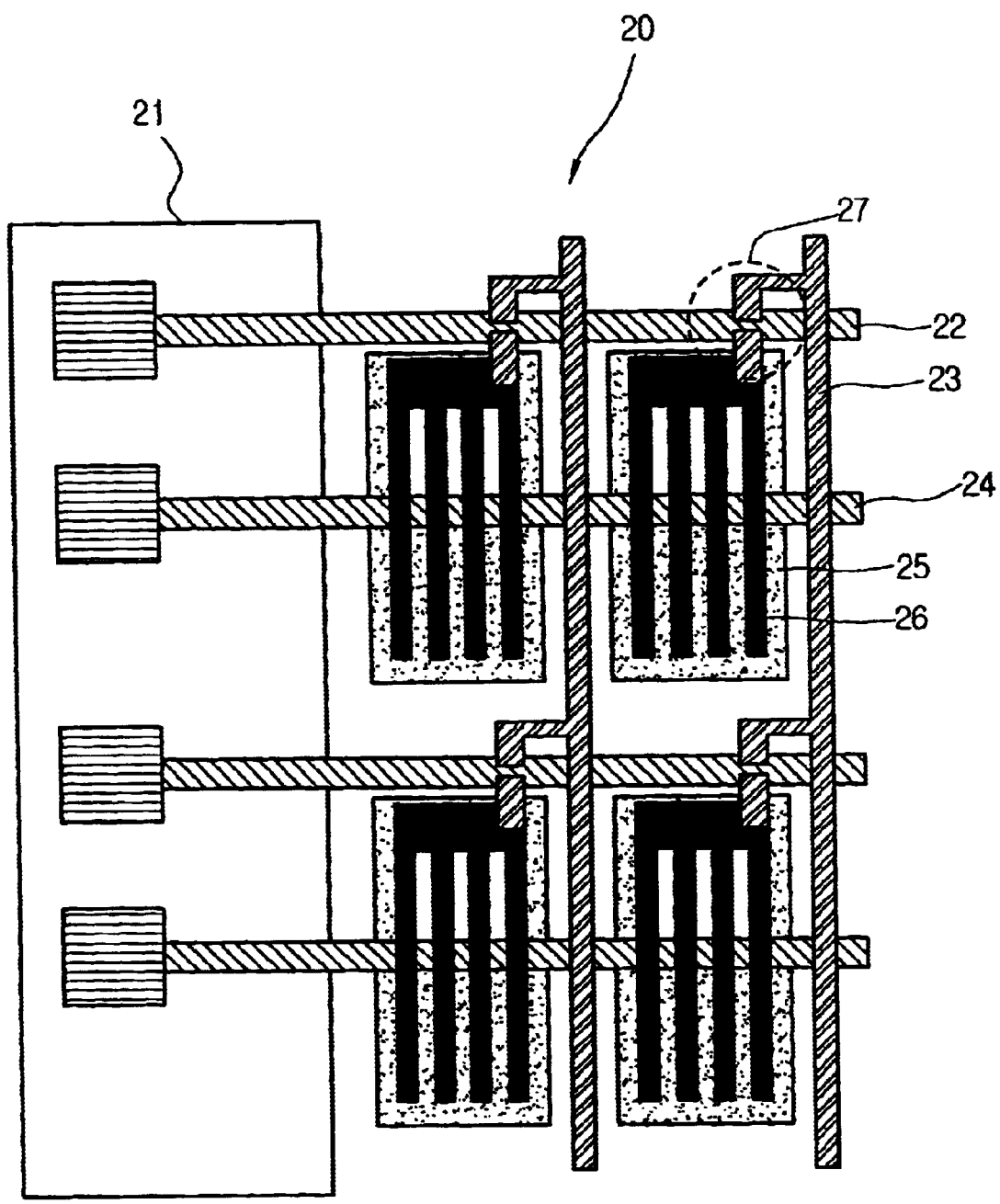
Figure 2A:
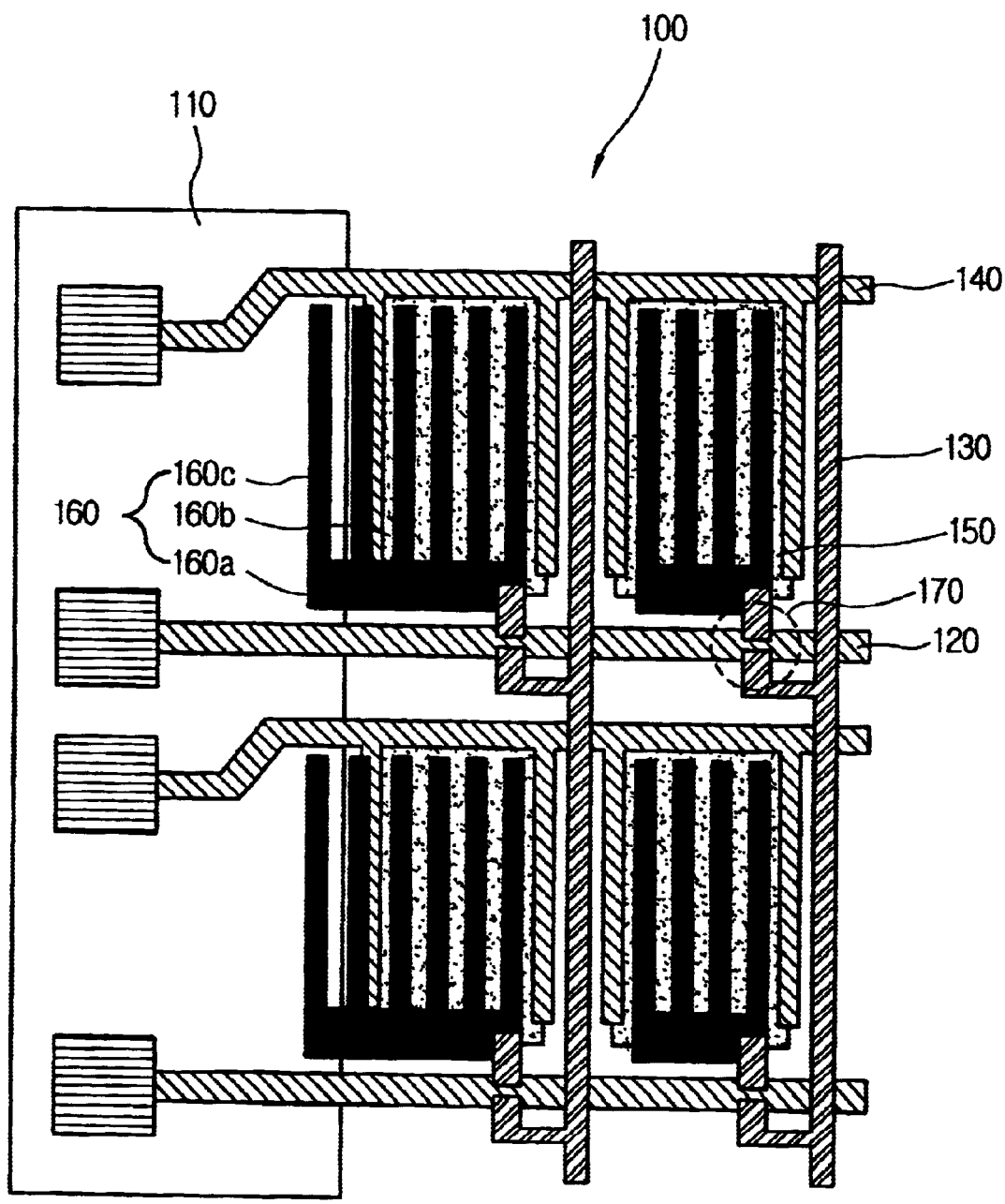
FIGS. 2A and 2B are cross-sectional views of LCD according to the present invention.

Referring to FIG. 2A, a substrate 190 of the present invention is divided into a signal applying unit 110 and a display unit 100 according to whether an image is realized or not.

The signal applying unit 110 applies a gate signal and a common signal to the display unit 100 in order to realize an image, comprising a gate line 120 and a common line 140.

The display unit 100 of the substrate 190 realizes an image, comprising a data line 130 arranged in a perpendicular direction, a gate line 120 arranged perpendicular to the data line 140 in a matrix shape and extended from the signal applying unit 110 and a common line 140 parallel to the gate line 120 and extended from the signal applying unit 100.

And, at the intersection of the gate line 120 and the data line 130, a TFT 170 is formed as a switching device.

A counter electrode 150 and a pixel electrode are formed on the display unit 100, wherein the counter electrode 150 is formed in a pixel defined by a pair of gate line 120 and data line 130 and the pixel electrode 160 is overlapped with the counter electrode 150, thereby generating electric field.

The pixel electrode 160 comprises a body unit 160a and a plurality of branch units 160b, 160c. The body unit 160a is parallel to the gate line 120 and the branch units 160b, 160c are parallel to the data line 130.

In the pixel the most adjacent to the signal applying unit 110, some branch unit 160c in a plurality of branch units of pixel electrode 160 is formed on the signal applying unit 110.

The branch unit 160c formed on the signal applying unit 110 applies the same voltage as other branch unit 160b of the pixel electrode 160 applies.

In the following, operation method of the present invention will be described in more detail.

A data signal is applied to a plurality of branch units 160b,160c of the pixel electrode 160, thereby a pulse signal as alternating current is applied to the common line voltage 140.

Therefore, it is possible to prevent ion adsorption due to DC component voltage difference between the gate line 120 signal and the common line 140 signal by AC signal in a branch unit 160c of pixel electrode formed out of the pixel, that is, on the signal applying unit 110. And it is also possible to prevent ion adsorption and ion diffusion into the display unit 100.

The above-mentioned operation method relates to Storage On Gate method LCD, wherein the common line 140 is formed out of the pixel.

Figure 2B:
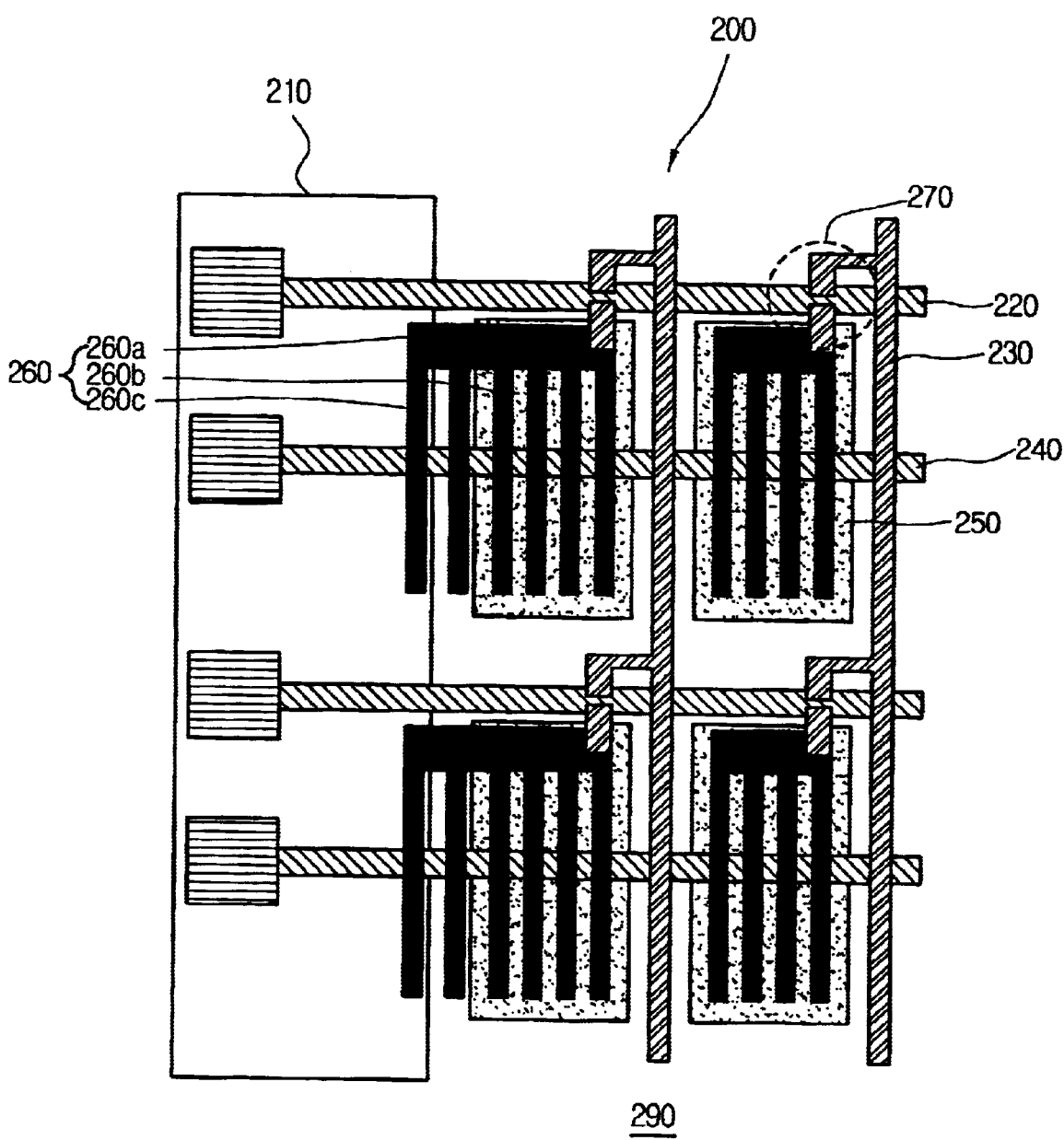

Referring to FIG. 2B, it is the same with Storage On Common mode LCD, wherein the common line 240 is on the center part of pixel.

As described above, according to the present invention, it is possible to prevent ion adsorption due to voltage difference between a gate line and a common line in a signal applying unit since a pixel electrode of outmost pixel is extended to the signal applying unit.

As a result, undesirable electric field is not generated by ion adsorption, thereby preventing light leakage on the edge of screen and improving screen quality of LCD.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A Liquid Crystal Display comprising:

a substrate;

a signal applying unit having a gate line and a common line on the substrate; and a display unit having a plurality of pixels with a data line, a counter electrode, a pixel electrode, a TFT and the gate line and the common line extended from the signal applying unit, wherein the pixel electrode comprises a body unit and a branch unit, the body unit being parallel to the gate line and the branch unit comprising a plurality of branches being parallel to the data line, and pixel electrode of the pixel the most adjacent to the signal applying unit has some of branches formed on the signal applying unit.

2. The LCD of claim 1, wherein some branches of pixel electrode formed on the signal applying unit apply the same voltage as other branches of pixel electrode in the pixel the most adjacent to the signal applying unit.

* * * * *